United States Patent
Yu et al.

(10) Patent No.: US 10,714,979 B2
(45) Date of Patent: Jul. 14, 2020

(54) WIRELESS POWER RECEIVING TERMINAL AND WIRELESS CHARGING SYSTEM

(71) Applicant: NINGBO WEIE ELECTRONICS TECHNOLOGY LTD., Ningbo, Zhejiang (CN)

(72) Inventors: Feng Yu, Zhejiang (CN); Weiyi Feng, Zhejiang (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 28 days.

(21) Appl. No.: 16/003,320

(22) Filed: Jun. 8, 2018

(65) Prior Publication Data

US 2018/0358844 A1    Dec. 13, 2018

(30) Foreign Application Priority Data

Jun. 9, 2017    (CN) .............................. 2017 1 430942

(51) Int. Cl.
| | | |
|---|---|---|
| *H02J 7/00* | (2006.01) | |
| *H02J 50/12* | (2016.01) | |
| *H02M 7/217* | (2006.01) | |
| *H02J 7/02* | (2016.01) | |

(52) U.S. Cl.
CPC .............. *H02J 50/12* (2016.02); *H02J 7/025* (2013.01); *H02M 7/217* (2013.01)

(58) Field of Classification Search
CPC ........... H02J 50/12; H02J 7/025; H02M 7/217
USPC .......................................... 320/108; 307/104
See application file for complete search history.

(56) References Cited

U.S. PATENT DOCUMENTS

| | | | | |
|---|---|---|---|---|
| 2013/0099591 A1* | 4/2013 | Yeo | ...................... | H02M 3/3376 307/104 |
| 2016/0111892 A1* | 4/2016 | Joehren | .................. | H02H 9/041 361/56 |

FOREIGN PATENT DOCUMENTS

| | | |
|---|---|---|
| CN | 203691262 | 7/2014 |
| CN | 104682680 | 6/2015 |
| CN | 105529839 | 4/2016 |
| CN | 106160514 | 11/2016 |
| CN | 106469988 | 3/2017 |
| CN | 106710953 A | 5/2017 |

(Continued)

*Primary Examiner* — Zixuan Zhou
(74) *Attorney, Agent, or Firm* — Andrus Intellectual Property Law, LLP (57) ABSTRACT

A wireless power receiving terminal and a wireless charging system are disclosed. A switch is arranged between any one of the input ports and any one of the output ports of a full-bridge rectifying circuit for switching the operation mode of the rectifying circuit. The full-bridge rectifying circuit operates normally when the switch is turned off. A portion of rectifying components in the full-bridge rectifying circuit operate in a half-bridge multiplying mode and the other portion of the rectifying components are short-circuited and do not operate when the switch is turned on. Thus, the rectifying mode of the rectifying circuit and then an output voltage of the rectifying circuit are adjustable, and the operation voltage range of the wireless electric energy receiving terminal is expanded and the wireless power receiving terminal can operate normally when the magnetic field intensity is relatively high or relatively low. And at the meanwhile, it is also possible to provide a post-stage circuit (such as DC-DC converter) with relatively small operation voltage range to reduce the cost.

18 Claims, 6 Drawing Sheets

(56) References Cited

FOREIGN PATENT DOCUMENTS

| | | |
|---|---|---|
| CN | 106787254 A | 5/2017 |
| CN | 106961165 A | 7/2017 |
| CN | 107222002 A | 9/2017 |
| CN | 107342632 A | 11/2017 |
| WO | 2013136409 | 9/2013 |

* cited by examiner

WIRELESS POWER RECEIVING TERMINAL AND WIRELESS CHARGING SYSTEM

CROSS-REFERENCE TO RELATED PATENT APPLICATIONS

The present application claims the priority of the Chinese application No. 201710430942.7 with the title of "WIRELESS POWER RECEIVING TERMINAL AND WIRELESS CHARGING SYSTEM" filed on Jun. 9, 2017, the entire contents of which is incorporated herein by reference.

FIELD OF THE INVENTION

The present disclosure relates to power electronic technology, in particular, to wireless charging technology, and more particularly, to a wireless power receiving terminal and a wireless charging system that can adjust rectifying mode.

BACKGROUND

Figure 1:
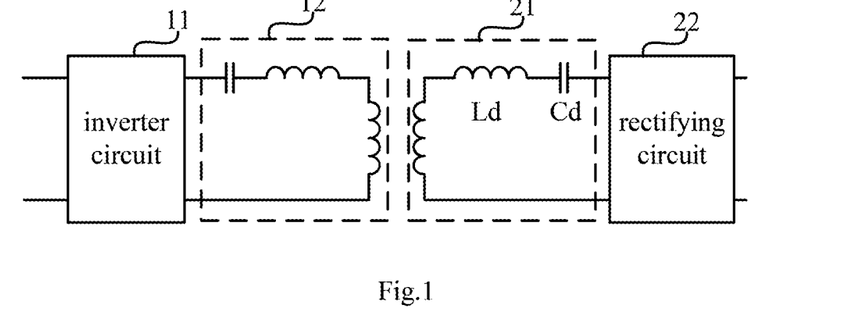
FIG. 1 is a circuit diagram of a wireless charging system of prior art.
Figure 2:
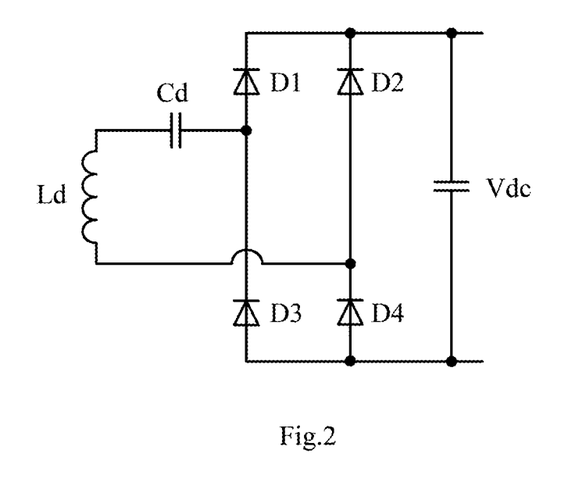
FIG. 2 is a circuit diagram of a wireless power receiving terminal adopting a full-bridge rectifying circuit.
Figure 3:
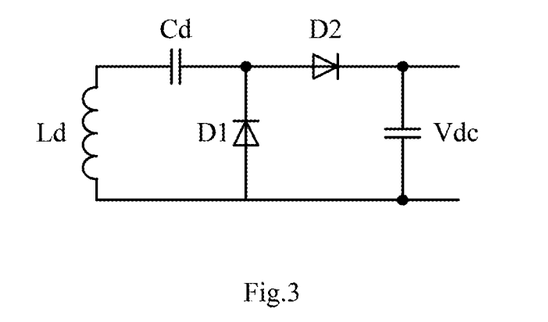
FIG. 3 is a circuit diagram of a wireless power receiving terminal adopting a half-bridge rectifying circuit.

A wireless charging system can deliver power in a non-contact manner between a wireless power transmitting terminal and a wireless power receiving terminal. A typical wireless charging system is shown in FIG. 1. The wireless power transmitting terminal 1 comprises an input capacitance Vin, an inverter circuit 11, and a transmitting-side resonant circuit 12. The wireless power receiving terminal 2 comprises a receiving-side resonant circuit 21 and a rectifying circuit 22. The transmitting-side resonance circuit 12 and the receiving-side resonance circuit 21 are coupled to each other in a non-contact manner through an alternating magnetic field of a resonant frequency, thereby achieving wireless power transmission. The rectifying circuit 22 is used for converting an alternating current generated by the receiving-side resonant circuit 21 in response to the alternating magnetic field into a direct current output. In general, the rectifying circuit 22 may adopt a full-bridge rectifying circuit (as shown in FIG. 2) or a half-bridge rectifying circuit (as shown in FIG. 3). However, no matter which one is adopted, it can only operate in one mode, which makes the operation voltage range of the circuit relatively narrow.

SUMMARY OF THE INVENTION

In view of this, the present disclosure provides a wireless power receiving terminal and a wireless charging system, so that the wireless power receiving terminal can have a larger operation voltage range and can operate normally when the magnetic field intensity is relatively high or relatively low.

According to a first aspect of the present disclosure, a wireless power receiving terminal is provided which comprises:

a receiving-side resonant circuit configured to wirelessly receive power;

a full-bridge rectifying circuit with an input port connected to an output port of the receiving-side resonant circuit; and a switch connected between any one of the input ports and any one of the output ports of the full-bridge rectifying circuit and controlled to be turned on or off to adjust an operation mode of the full-bridge rectifying circuit.

In one embodiment, the switch is controlled to be turned off when an output voltage amplitude of the receiving-side resonant circuit is higher than a first threshold and is controlled to be turned on when the output voltage amplitude of the receiving-side resonant circuit is lower than the first threshold.

In one embodiment, the switch is controlled to be turned off when an output voltage of the full-bridge rectifying circuit is higher than a second threshold and is controlled to be turned on when the output voltage of the full-bridge rectifying circuit is lower than the second threshold.

In one embodiment, the switch is a controllable electrical switch or a controllable mechanical switch.

In one embodiment, the switch is a metal oxide semiconductor transistor (MOSFET), a bipolar transistor (BJT) or an insulated gate bipolar transistor (IGBT).

In one embodiment, the receiving-side resonant circuit comprises a receiving coil.

In one embodiment, the receiving-side resonant circuit further comprises:

a receiving capacitance in series with the receiving coil.

In one embodiment, the full-bridge rectifying circuit comprises:

a first diode connected between a first port of input ports and a first port of output ports of the full-bridge rectifying circuit;

a second diode connected between a second port of the input ports and the first port of the output ports of the full-bridge rectifying circuit;

a third diode connected between the first port of the input ports and a second port of the output ports of the full-bridge rectifying circuit; and a fourth diode connected between the second port of the input ports and the second port of the output ports of the full-bridge rectifying circuit.

According to a second aspect of the present disclosure, a wireless charging system is provided which comprises:

a wireless power transmitting terminal configured to wirelessly transmit power; and at least one wireless power receiving terminal as stated above.

According to the technical solution of the present disclosure, a switch is arranged between any one of the input ports and any one of the output ports of a full-bridge rectifying circuit for switching the operation mode of the rectifying circuit. The full-bridge rectifying circuit operates normally when the switch is turned off. A portion of rectifying components in the full-bridge rectifying circuit operate in a half-bridge multiplying mode and the other portion of the rectifying components are short-circuited and do not operate when the switch is turned on. Thus, the rectifying mode of the rectifying circuit and then an output voltage of the rectifying circuit are adjustable, and the operation voltage range of the wireless electric energy receiving terminal is expanded and the wireless power receiving terminal can operate normally when the magnetic field intensity is relatively high or relatively low. And at the meanwhile, it is also possible to provide a post-stage circuit (such as DC-DC converter) with relatively small operation voltage range to reduce the cost.

BRIEF DESCRIPTION OF THE DRAWINGS

The above and other objects, features and advantages of the present disclosure will become more apparent from the following description of the embodiments of the present disclosure with reference to the accompanying drawings in which.

DETAILED DESCRIPTION

Several embodiments of the present disclosure will be described in detail below with reference to the accompanying drawings, but the present disclosure is not limited to these embodiments. The present disclosure covers any alternatives, modifications, equivalent methods and schemes that are made in the nature and scope of the present disclosure. In order to give the public a thorough understanding of the present disclosure, specific details are described in detail in the following embodiments of the present disclosure, and the present disclosure can be fully understood by those skilled in the art without the description of these details.

The term "comprise" used in the claims should not be interpreted as limitation to the device listed thereafter. It does not exclude other components or steps. Therefore, the scope of the expression "an apparatus comprising devices A and B" should not be limited to the apparatus comprising only components A and B. It means that the relevant components of the apparatus are A and B with respect to the present disclosure.

Moreover, the terms first, second, third and the like in the description and claims are used for distinguishing between similar elements and not necessarily for describing a sequential or chronological order. It should be understood that such terms so used are interchangeable under appropriate circumstances and the embodiments of the present disclosure described herein can operate in other sequences than those described or illustrated herein.

It will be understood that when an element is referred to as being "connected" or "coupled" to another element, it can be directly connected or coupled to the other element or intervening elements may be present. In contrast, when an element is referred to be "directly connected" or "directly coupled" to another element, there are no intermediate elements. Other words used to describe the relationship between components should be understood in the same way (i.e., "between" versus "directly between", "adjacent" versus "directly adjacent", etc.).

Figure 4:
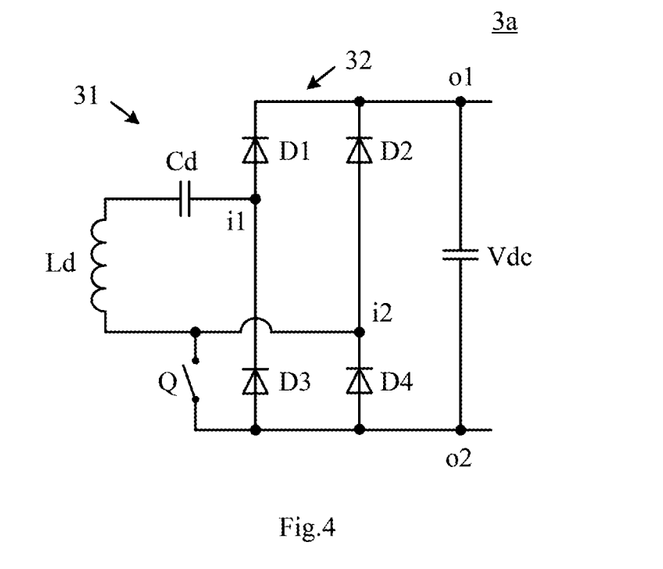
FIG. 4 is a circuit diagram of a wireless power receiving terminal according to a first embodiment of the present disclosure.

FIG. 4 is a circuit diagram of a wireless power receiving terminal according to a first embodiment of the present disclosure. As shown in FIG. 4, the wireless power receiving terminal 3a of the present embodiment comprises a receiving-side resonant circuit 31, a full-bridge rectifying circuit 32 and a switch Q. Among them, the receiving-side resonant circuit 31 is configured to be coupled with a transmitting-side resonant circuit of a corresponding wireless power transmitting terminal (not shown in the Figure) in a non-contact manner so as to wirelessly receive power. The receiving-side resonant circuit 31 may comprise a receiving coil Ld. In one embodiment, the receiving-side resonant circuit 31 further comprises a receiving capacitance Cd in series with the receiving coil Ld, both of which form a series resonant circuit which can resonate in response to an alternating magnetic field of a frequency that is a predetermined operation frequency f0 to output an alternating current. In another embodiment, the receiving capacitance Cd may be formed by forming a parasitic capacitance between receiving coil conductors, so that it is not necessary to provide a separate capacitance element.

A bridge rectifying circuit is divided into a full-bridge rectifying circuit and a half-bridge rectifying circuit. The full-bridge rectifying circuit forms two bridge arms by using four diodes so as to maintain output during both positive half cycle and negative half cycle of the alternating current. When a half-bridge rectifying circuit is applied to the wireless power receiving terminal, the receiving capacitance Cd and the diodes D1-D2 and the output capacitance Vdc of the half-bridge rectifying circuit form a half-bridge voltage-multiplying rectifying circuit (as shown in FIG. 3). During the negative half cycle of the alternating current, the diode D1 is turned on and the diode D2 is turned off, and the alternating current charges the capacitance Cd to a certain voltage value through the diode D1. During the positive half cycle of the alternating current, the diode D1 is turned off and the diode D2 is turned on, and the alternating current is supplied to the output port of the rectifying circuit through the diode D2. At this time, the voltage across the capacitance Cd before will be superimposed with a voltage generated during the positive half cycle of the alternating current to output to the output port, so that the voltage at the output port is several times the voltage of the alternating current. Thus, when a half-bridge rectifying circuit is applied to the wireless power receiving terminal, its output voltage is higher than that of a full-bridge rectifying circuit. Therefore, when the wireless power receiving terminal is at a position where the alternating magnetic field intensity is relatively low, if the rectifying circuit used by the wireless power receiving terminal is a full-bridge rectifying circuit, its output direct current voltage may be very low, such as less than 5V, which will make the output voltage unable to drive the follow-up circuit (such as DC-DC converter) to operate, the wireless power receiving terminal does not operate actually and the wireless charging range is relatively small. While if a half-bridge rectifying circuit capable of voltage-multiplying rectifying is used, since the output voltage is twice that of the voltage of the alternating current, the output of the rectifying circuit can be higher than 5V at a position where the magnetic field intensity is relatively low, and the wireless power receiving terminal can still operate. However, if the output voltage of the half-bridge rectifying circuit is too high at a position where the magnetic field intensity is relatively high, for example, higher than 40V, the post-stage circuit will be damaged. If the rectified voltage is reduced by adjusting the parameters, the charging range cannot be effectively expanded. While if the operation range is expanded by improving the withstand voltage performance of the post-stage circuit, the cost of the equipment will be greatly increased.

In view of this, in the present embodiment, the full-bridge rectifying circuit 32 and the switch Q are provided. The full-bridge rectifying circuit comprises diodes D1-D4. The diode D1 is connected between a port i1 of the input ports and a port o1 of the output ports. The diode D2 is connected between a port i2 of the input ports and the port o1 of the output ports. The diode D3 is connected between the port i1 of the input ports and a port o2 of the output ports. The diode D4 is connected between the port i2 of the input port and the port o2 of the output ports.

Figure 5:
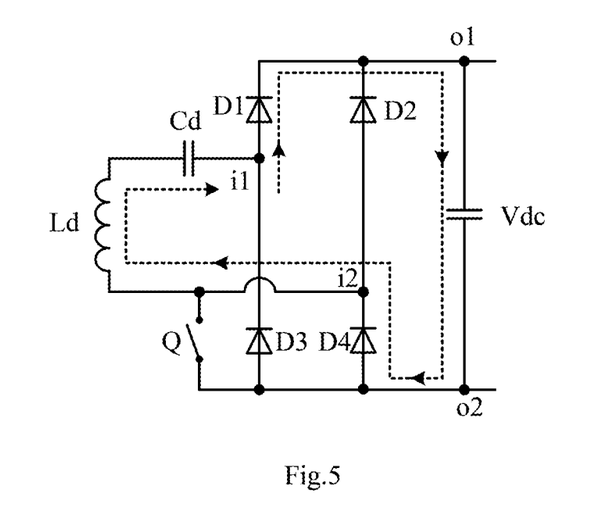
FIG. 5 is an equivalent circuit diagram of the wireless power receiving terminal according to the first embodiment of the present disclosure in a first state of a first mode.
Figure 6:
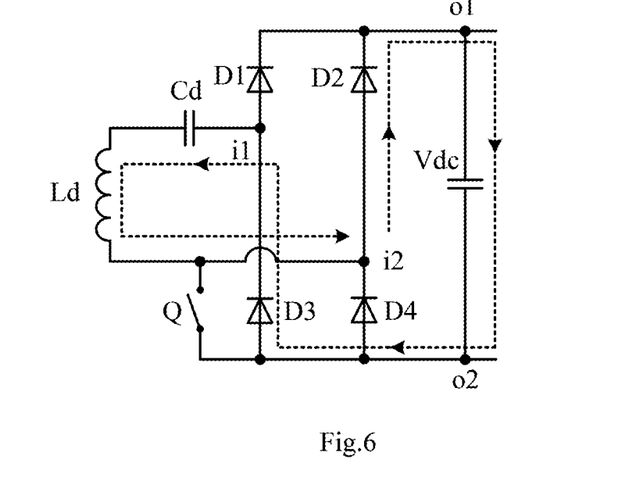
FIG. 6 is an equivalent circuit diagram of the wireless power receiving terminal according to the first embodiment of the present disclosure in a second state of a first mode.

In the present embodiment, the switch Q is provided between the port i2 of the input ports and the port o2 of the output ports of the full-bridge rectifying circuit 32. The operation mode of the rectifying circuit is switched by turning on and off the switch Q. When the switch Q is turned off, the wireless power receiving terminal 3a is in a first mode. As shown in FIG. 5, during the positive half cycle of the alternating current, the voltage at the port i1 is higher than that at the port i2. At this time, the wireless power receiving terminal 3a is in a first state of the first mode, that is, the diodes D1 and D4 are turned on and the diodes D2 and D3 are turned off to form a current loop of the coil Ld, the capacitance Cd, the diode D1, the output capacitance Vdc and the diode D4. As shown in FIG. 6, during the negative half cycle of the alternating current, the voltage at the port i1 is lower than that at the port i2. The wireless power receiving terminal 3a is in a second state of the first mode, that is, the diodes D2 and D3 are turned on and the diodes D1 and D4 are turned off to form a current loop of the capacitance Cd, the coil Ld, the diode D2, the output capacitance Vdc and the diode D3. In the first state and the second state, the direction of the voltage across the output capacitance Vdc (that is, the voltage between the port o1 and the port o2) remains unchanged and a full-bridge rectification is realized.

Figure 7:
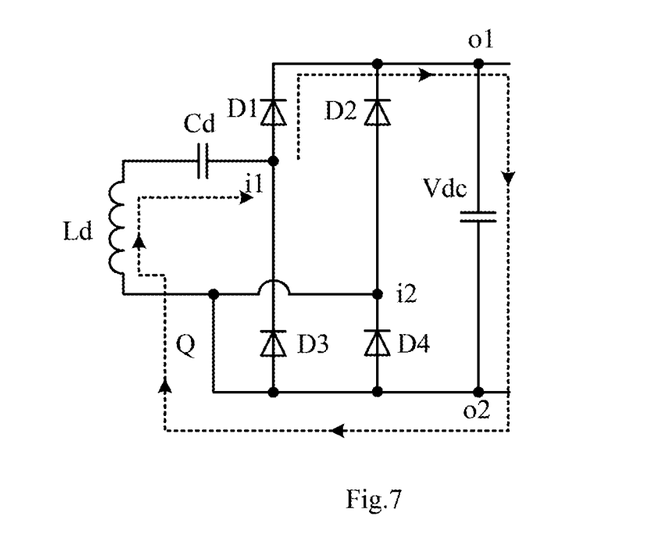
FIG. 7 is an equivalent circuit diagram of the wireless power receiving terminal according to the first embodiment of the present disclosure in a first state of a second mode.
Figure 8:
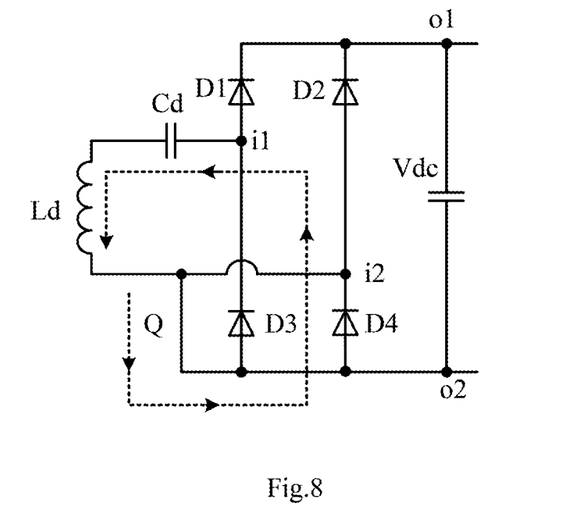
FIG. 8 is an equivalent circuit diagram of the wireless power receiving terminal according to the first embodiment of the present disclosure in a second state of a second mode.

When the switch Q is turned on, the diode D4 is short-circuited and the wireless power receiving terminal 3a is switched to a second mode. As shown in FIG. 7, during the positive half cycle of the alternating current, the voltage at the port i1 is higher than that at the port i2. The wireless power receiving terminal 3a is in a first state of the second mode, that is, the diode D1 is turned on and the diodes D2, D3 and D4 all remain off to form a current loop of the coil Ld, the capacitance Cd, the diode D1, the output capacitance Vdc and the switch Q. The receiving-side resonant circuit 31 supplies power to the rectifying circuit. As shown in FIG. 8, during the negative half cycle of the alternating current, the voltage at the port i1 is lower than that at the port i2. The wireless power receiving terminal 3a is in a second state of the second mode, that is, the diode D2 is turned on, and the diodes D1, D3 and D4 all remain off to form a current loop of the coil Ld, the switch Q, the diode D3, and the capacitance Cd. It can be seen that the diodes D2 and D4 in the full-bridge rectifying circuit have no effect in the second mode since the switch Q is turned on. The full-bridge rectifying circuit cooperates with the switch Q to actually operate in the form of a half-bridge voltage-multiplying rectifying circuit. That is, during the negative half cycle of the alternating current, the capacitance Cd is charged. During the positive half cycle of the alternating current, the voltage across the capacitance Cd is superimposed with the alternating current generated by the resonant to supply power to the output port of the rectifying circuit. As a result, the output port voltage can be relatively high.

Thus, in the first mode, the switch Q is turned off so as to enable the full-bridge rectifying to operate normally and the output voltage is relatively low, while in the second mode, the switch Q is turned on so that one portion of the full-bridge rectifying circuit is short-circuited to operate in the form of a half-bridge multiplying rectifying circuit and the output voltage is relatively high. Using the characteristics of different modes, when the magnetic field intensity is relatively high, the switch Q is controlled to be turned off to avoid output over-voltage, and when the magnetic field intensity is relatively low, the switch Q is controlled to be turned on to increase the output voltage. Thus, the operation range of the wireless power receiving terminal can be effectively expanded, so that the wireless power receiving terminal can operate normally in various positions, and at the meanwhile, it does not need to substantially increase the cost of the equipment.

Specifically, the intensity of the magnetic field may be determined by detecting the amplitude of the alternating current voltage generated by the resonance or the output voltage of the rectifying circuit. For example, when the output voltage amplitude of the receiving-side resonant circuit is higher than the first threshold, the switch Q is controlled to be turned off so that the wireless power receiving terminal 3a is in the first mode to avoid output over-voltage. When the output voltage amplitude of the receiving-side resonant circuit is lower than the first threshold, the switch Q is controlled to be turned on so that the wireless power receiving terminal is in the second mode, and the output voltage is increased, so that the wireless power receiving terminal can still operate normally when the magnetic field is relatively weak. For another example, when the output voltage of the rectifying circuit is higher than the second threshold, the switch Q is controlled to be turned off so that the wireless power receiving terminal 3a is in the first mode to avoid output over-voltage, and when the output voltage of the rectifying circuit is lower than the second threshold, the switch Q is controlled to be turned on so that the wireless power receiving terminal is in the second mode and the output voltage is increased, so that the wireless power receiving terminal can still operate normally when the magnetic field is relatively weak.

Figure 9:
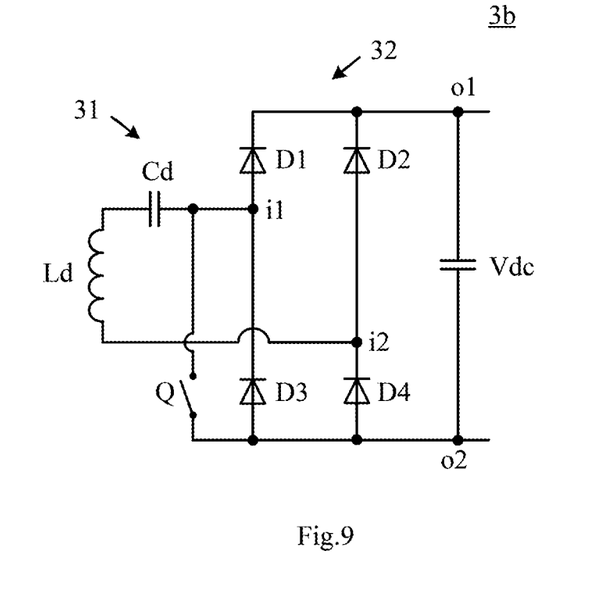
FIG. 9 is a circuit diagram of a wireless power receiving terminal according to a second embodiment of the present disclosure.

FIG. 9 is a circuit diagram of a wireless power receiving terminal according to a second embodiment of the present disclosure. As shown in FIG. 9, in the wireless power receiving terminal 3b of this embodiment, the switch Q is connected between the port i1 of the input ports and the port o2 of the output ports of the full-bridge rectifying circuit 32. Since the full-bridge rectifying circuit 32 is a completely symmetrical structure, the same effect as that of the first embodiment can be substantially achieved when the switch Q is turned on. When the switch Q is turned off, the full-bridge rectifying circuit 32 operates normally. When the switch Q is turned on, a current loop of the coil Ld, the capacitance Cd, the switch Q and the diode D4 is formed in the first state, and the capacitance Cd is charged during the positive half cycle of the alternating current. A current loop of the capacitance Cd, the coil Ld, the diode D2, the output capacitance Vdc and the switch Q is formed in the second state. During the negative half cycle of the alternating current, the alternating current generated by the resonance and the voltage across the capacitance Cd simultaneously supply power to the output ports. Thus, it is also possible to increase the output voltage in the second mode so that the wireless power receiving terminal can still operate normally when the magnetic field intensity is relatively low. The operation range of the wireless power receiving terminal is effectively expanded so that the wireless power receiving terminal can operate normally at various positions, and at the meanwhile, it does not need to substantially increase the cost of the equipment.

Figure 10:
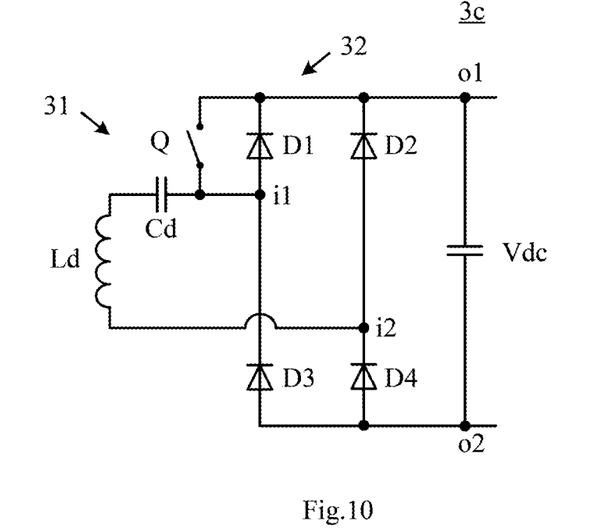
FIG. 10 is a circuit diagram of a wireless power receiving terminal according to a third embodiment of the present disclosure.

FIG. 10 is a circuit diagram of a wireless power receiving terminal according to a third embodiment of the present disclosure. As shown in FIG. 10, in the wireless power receiving terminal 3c of this embodiment, the switch Q is connected between the port i1 of the input ports and the port o1 of the output ports of the full-bridge rectifying circuit 32. When the switch Q is turned off, the full-bridge rectifying circuit 32 operates normally. When the switch Q is turned on, a current loop of the coil Ld, the capacitance Cd, the switch Q, the output capacitance Vdc and the diode D4 is formed during the positive half cycle of the alternating current. A current loop of the coil Ld, the diode D2, the switch Q and the capacitance Cd is formed during the negative half cycle of the alternating current. The alternating current generated by the resonance charges the capacitance Cd during the negative half cycle of the alternating current. The voltage across the capacitance Cd and the voltage generated by the resonance simultaneously supply power to the output ports during the positive half cycle of the alternating current. Thus, it is also possible to increase the output voltage in the second mode so that the wireless power receiving terminal can still operate normally when the magnetic field intensity is relatively low. The operation range of the wireless power receiving terminal is effectively expanded so that the wireless power receiving terminal can operate normally at various positions, and at the meanwhile, it does not need to substantially increase the cost of the equipment.

Figure 11:
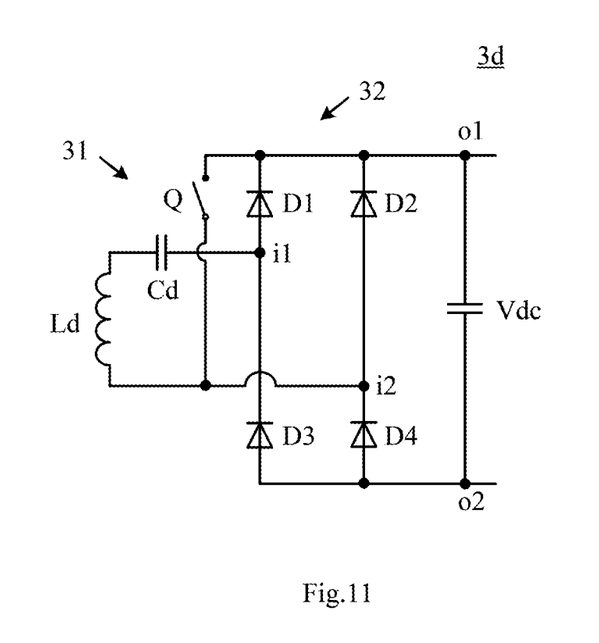
FIG. 11 is a circuit diagram of a wireless power receiving terminal according to a fourth embodiment of the present disclosure.

FIG. 11 is a circuit diagram of a wireless power receiving terminal according to a fourth embodiment of the present disclosure. As shown in FIG. 11, in the wireless power receiving terminal 3d of this embodiment, the switch Q is connected between the port i2 of the input ports and the port o1 of the output ports of the full-bridge rectifying circuit 32. When the switch Q is turned off, the full-bridge rectifying circuit 32 operates normally. When the switch Q is turned on, a current loop of the coil Ld, the capacitance Cd, the diode D1 and the switch Q is formed during the positive half cycle of the alternating current, and the capacitance Cd is charged by the voltage generated by the resonance. A current loop of the capacitance Cd, the coil Ld, the switch Q, the output capacitance Vdc and the diode D3 is formed during the negative half cycle of the alternating current. The voltage across the capacitance Cd and the voltage generated by the resonance simultaneously supply power to the output ports. Thus, it is also possible to increase the output voltage in the second mode so that the wireless power receiving terminal can still operate normally when the magnetic field intensity is relatively low. The operation range of the wireless power receiving terminal is effectively expanded so that the wireless power receiving terminal can operate normally at various positions, and at the meanwhile, it does not need to substantially increase the cost of the equipment.

In summary, the switch Q can be connected between any one of the input ports and any one of the output ports of the full bridge rectifying circuit 32. The full-bridge rectifying circuit operates normally when the switch Q is turned off. When the switch Q is turned on, the full-bridge rectifying circuit operates in half-bridge mode with D1 and D3 or D2 and D4.

It should be understood that in the above embodiments, the switch Q may adopt a controllable electrical switch, such as a metal oxide semiconductor transistor (MOSFET), a bipolar transistor (BJT) or an insulated gate bipolar transistor (IGBT), or it may adopt a controllable mechanical switch, such as relay.

Figure 12:
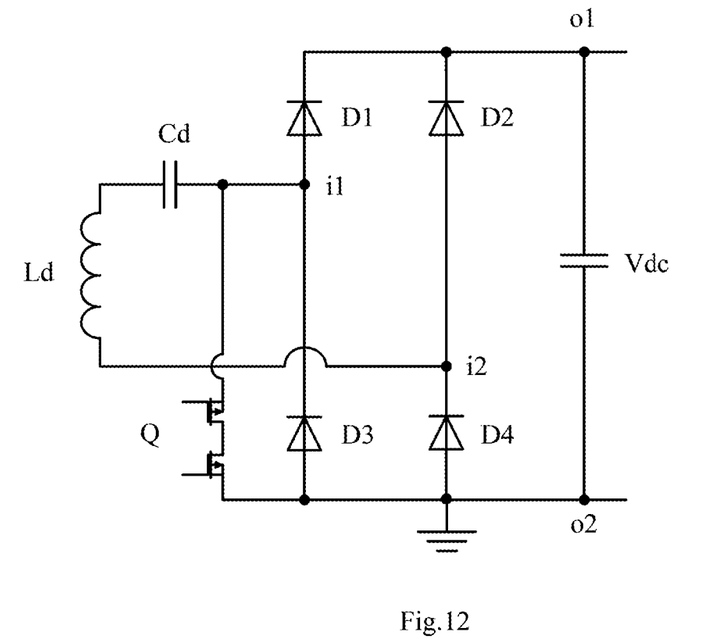
FIG. 12 is a circuit diagram of a wireless power receiving terminal according to a fifth embodiment of the present disclosure.
Figure 13:
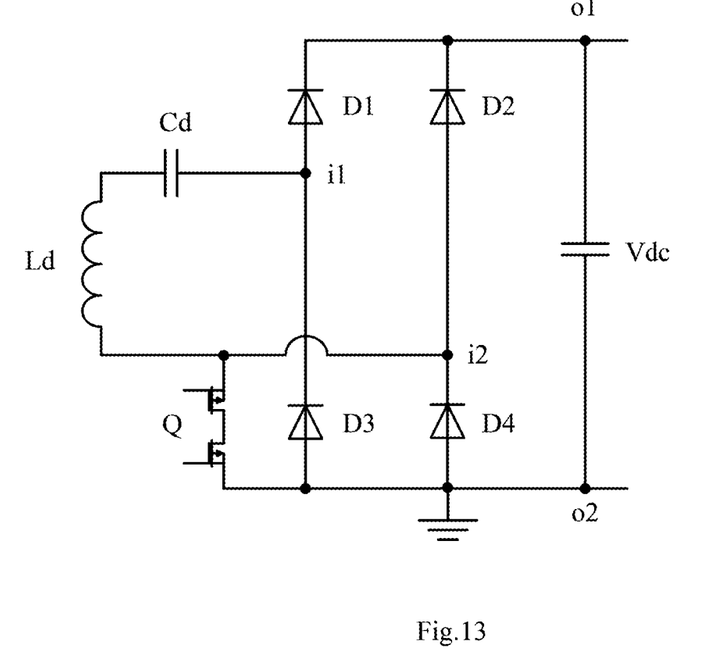
FIG. 13 is a circuit diagram of a wireless power receiving terminal according to a sixth embodiment of the present disclosure.

FIGS. 12 and 13 are circuit diagrams of a wireless power receiving terminal according to a fifth embodiment and a sixth embodiment of the present disclosure respectively. As shown in FIGS. 12 and 13, in both embodiments, the switch Q adopts a bidirectional switch circuit composed of a pair of metal oxide semiconductor transistors. The switch Q is connected between the port i1 or i2 of the input ports and the port o2 of the output ports (that is, the ground terminal of the output ports). By using a metal oxide semiconductor transistor, the switch Q is more easily to be driven when the switch Q and the output port are grounded together, which enables the circuit to operate more smoothly.

All the wireless power receiving terminals according to various embodiments of the present disclosure can be used in corporation with various existing resonant type wireless power transmitting terminal to constitute a wireless charging system.

The above description is a description of the embodiments of the present disclosure. Various changes and modifications may be made without departing from the scope of the present disclosure. The present disclosure is presented for illustrative purposes and should not be interpreted as an exclusive description of all embodiments of the present disclosure or as limiting the scope of the present disclosure to the specific elements illustrated and described in conjunction with these embodiments. Any one or more of the individual elements of the described disclosure may be replaced by a replacement element that provides substantially similar functionality or otherwise provides a sufficient operation without any limitation. This comprises currently known replacement elements, such as those currently known to those skilled in the art, as well as the replacement elements that may be developed in the future, such as those that the skilled in in the art might recognize as an alternative at the time of development.

What is claimed is:

1. A wireless power receiving terminal comprising:
   a receiving-side resonant circuit configured to wirelessly receive power, wherein the receiving-side resonant circuit has a first output port and a second output port;
   a full-bridge rectifying circuit having a first input port, a second input port, a first output port and a second output port, wherein the first input port of the full-bridge rectifying circuit is connected to the first output port of the receiving-side resonant circuit, and the second input port of the full-bridge rectifying circuit is connected to the second output port of the receiving-side resonant circuit; and
   a switch, wherein a first terminal of the switch is connected to one of the first input port and the second input port of the full-bridge rectifying circuit, and a second terminal of the switch is connected to one of the first output port and the second output port of the full-bridge rectifying circuit,
   wherein the switch is turned off when an amplitude of an output voltage between the first output port and the second output port of the receiving-side resonant circuit is higher than a threshold, and the switch is turned on when the amplitude of the output voltage between the first output port and the second output port of the receiving-side resonant circuit is lower than the threshold.

2. The wireless power receiving terminal of claim 1, wherein the switch is a controllable electrical switch.

3. The wireless power receiving terminal of claim 2, wherein the switch is a metal oxide semiconductor transistor (MOSFET), a bipolar transistor (BJT) or an insulated gate bipolar transistor (IGBT).

4. The wireless power receiving terminal of claim 1, wherein the receiving-side resonant circuit comprises a receiving coil.

5. The wireless power receiving terminal of claim 4, wherein the receiving-side resonant circuit further comprises:
a receiving capacitance in series with the receiving coil.

6. The wireless power receiving terminal of claim 1, wherein the full-bridge rectifying circuit comprises:
a first diode connected between the first input port and the first output port of the full-bridge rectifying circuit;
a second diode connected between the second input port and the first output port of the full-bridge rectifying circuit;
a third diode connected between the first port of the input ports and a second port of the the first input port and the second output port of the full-bridge rectifying circuit; and
a fourth diode connected between the second input port and the second output port of the full-bridge rectifying circuit.

7. A wireless charging system comprising:
a wireless power transmitting terminal configured to wirelessly transmit power; and
at least one wireless power receiving terminal according to claim 1.

8. The wireless power receiving terminal of claim 1, wherein the switch is a controllable mechanical switch.

9. The wireless power receiving terminal of claim 8, wherein the controllable mechanical switch comprises a relay.

10. A wireless power receiving terminal, comprising:
a receiving-side resonant circuit configured to wirelessly receive power;
a full-bridge rectifying circuit having a first input port, a second input port, a first output port and a second output port, wherein the full-bridge rectifying circuit is configured to receive an alternating current (AC) voltage from the receiving-side resonant circuit via the first input port and the second input port, and output a direct current (DC) voltage via the first output port and the second output port; and
a switch, wherein a first terminal of the switch is connected to one of the first input port and the second input port of the full-bridge rectifying circuit, and a second terminal of the switch is connected to one of the first output port and the second output port of the full-bridge rectifying circuit,
wherein the switch is turned off when an amplitude of the DC voltage outputted by the receiving-side resonant circuit is higher than a threshold, and the switch is turned on when the amplitude of the DC voltage outputted by the receiving-side resonant circuit is lower than the threshold.

11. The wireless power receiving terminal of claim 10, wherein the switch is a controllable electrical switch.

12. The wireless power receiving terminal of claim 11, wherein the switch is a metal oxide semiconductor transistor (MOSFET), a bipolar transistor (BJT) or an insulated gate bipolar transistor (IGBT).

13. The wireless power receiving terminal of claim 10, wherein the receiving-side resonant circuit comprises a receiving coil.

14. The wireless power receiving terminal of claim 13, wherein the receiving-side resonant circuit further comprises: a receiving capacitance in series with the receiving coil.

15. The wireless power receiving terminal of claim 10, wherein the full-bridge rectifying circuit comprises:
a first diode connected between the first input port and the first output port of the full-bridge rectifying circuit;
a second diode connected between the second input port and the first output port of the full-bridge rectifying circuit;
a third diode connected between the first input port and the second output port of the full-bridge rectifying circuit; and
a fourth diode connected between the second input port and the second output port of the full-bridge rectifying circuit.

16. The wireless power receiving terminal of claim 10, wherein the switch is a controllable mechanical switch.

17. The wireless power receiving terminal of claim 16, wherein the controllable mechanical switch comprises a relay.

18. A wireless power receiving device, comprising:
a receiving-side resonant circuit configured to wirelessly receive power;
a full-bridge rectifying circuit having a first input port, a second input port, a first output port and a second output port, wherein the full-bridge rectifying circuit is configured to receive an alternating current (AC) voltage from the receiving-side resonant circuit via the first input port and the second input port, and output a direct current (DC) voltage via the first output port and the second output port; and
a bidirectional switch composed of a pair of metal oxide semiconductor transistors,
wherein the full-bridge rectifying circuit comprises a first diode, a second diode, a third diode and a fourth diode,
a first terminal of the first diode is connected to the first input port of the full-bridge rectifying circuit,
a first terminal of the second diode is connected to the second input port of the full-bridge rectifying circuit,
a first terminal of the bidirectional switch is connected to one of the first input port and the second input port of the full-bridge rectifying circuit,
a second terminal of the bidirectional switch, a first terminal of the third diode, a first terminal of the fourth diode, and the second output port of the full-bridge rectifying circuit are grounded together,
a second terminal of the third diode is connected to the first input port of the full-bridge rectifying circuit,
a second terminal of the fourth diode is connected to the second input port of the full-bridge rectifying circuit,
wherein the bidirectional switch is turned off when an amplitude of the AC voltage outputted by the receiving-side resonant circuit is higher than a threshold, and the bidirectional switch is turned on when the amplitude of the AC voltage outputted by the receiving-side resonant circuit is lower than the threshold.

* * * * *